United States Patent [19]

Wajs

[11] Patent Number: 4,650,616
[45] Date of Patent: Mar. 17, 1987

[54] PROCESS FOR MAKING A SOFT CONTACT LENS OF NATURAL PROTEINACEOUS POLYMER(S)

[75] Inventor: Georges H. Wajs, Ivry-sur-Seine, France

[73] Assignee: Essilor International, Cedex, France

[21] Appl. No.: 631,618

[22] Filed: Jul. 17, 1984

[30] Foreign Application Priority Data

Jun. 4, 1984 [FR] France .................................. 84 08710

[51] Int. Cl.⁴ .............................................. B29D 11/00
[52] U.S. Cl. ...................................... 264/2.6; 264/1.1; 523/106
[58] Field of Search ........................... 264/1.1, 1.4, 2.6; 351/160 H; 260/117; 128/DIG. 8; 523/106

[56] References Cited

U.S. PATENT DOCUMENTS

| | | |
|---|---|---|
| 3,553,299 | 1/1971 | Thiele et al. . |
| 3,760,045 | 9/1973 | Thiele et al. .......................... 264/2.3 |
| 4,260,228 | 4/1981 | Miyata ................... 260/117 |
| 4,264,155 | 4/1981 | Miyata .......................... 351/160 H |
| 4,268,131 | 5/1981 | Miyata et al. ................... 351/160 H |

FOREIGN PATENT DOCUMENTS 1568136  5/1980  United Kingdom .

Primary Examiner—James Lowe
Attorney, Agent, or Firm—Henry R. Lerner

[57] ABSTRACT

A starting solution comprising one or more noncrystalline natural proteinaceous polymers of animal or vegetable origin is molded and gelled in a lens shaped mold and then removed from the mold. Thereafter the gel is crosslinked by immersion in a liquid containing a crosslinking agent.

13 Claims, 1 Drawing Figure

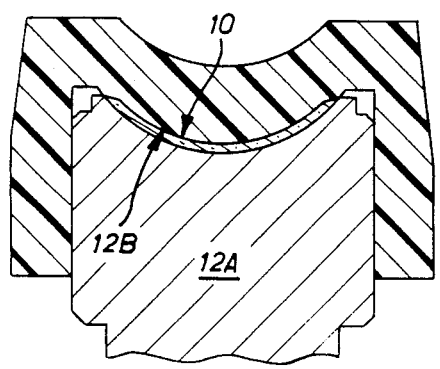

PROCESS FOR MAKING A SOFT CONTACT LENS OF NATURAL PROTEINACEOUS POLYMER(S)

FIELD OF THE INVENTION

The present invention relates to soft contact lenses made from natural polymers such as proteins or substances derived from gelatins.

BACKGROUND OF THE INVENTION

Soft contact lenses are conventionally made of synthetic material, for example, hydrogels of hydroxyethyl polymethacryalate and/or of polyvinylpyrrolidone.

It has been proposed to make contact lenses from a natural collagen which is a protein constituting the intercellular substance of conjunctive tissue, or its derivatives, such as a gelatin, obtained by hydrolysis of the collagen.

These materials are sought because of their biocompatibility.

In order to be usable such materials must be crosslinked to create a polymeric network or system which is insoluble, notably in water. Therefore, in a first stage, they must be put into solution in order to give them a lens shape by pouring into molds having well-defined geometrical characteristics, then crosslinking is carried out which under normal wear conditions is irreversible.

Very high molecular weight collagens are difficult to make soluble and therefore they have not to date yielded products having sufficient mechanical properties.

Gelatin solutions, on the other hand, may include up to 30% polymer and have the well-known property of gelling by simply cooling. In French patent No. 77 38695 an acid collagen solution placed in a mold is crosslinked by irradiation.

In European patent application 0011523, filed July 14, 1982, a noncrystalline natural hydrogel of animal or vegetable origin is put into a solution in an acid medium. Usually it is gelatin. A crosslinking agent is added before introducing the mixture thus formed in the concave part of a mold.

A drying operation at a temperature less than 35° C. is carried out until the amount of moisture has been reduced to 10%. The lens is then rehydrated in order to resume its configuration.

In this process the crosslinking of the lens is carried out at the same time as drying so that it is not possible to control reproducibility of such a process in an industrially satisfactory manner.

In U.S. Pat. No. 4,416,814 it is proposed to physically gel at low temperature a gelatin solution which does not contain any crosslinking agent though possibly agents contributing to physical gelation.

After opening the mold the lens must remain on one of the two parts of the mold, for example the convex part. It is then placed in a hermetic container with a crosslinking solution. All contact between the solution and the lens is carefully avoided so that only the vapor phase is operative in the crosslinking process which therefore is extremely time-consuming. Monitoring the hydrophilia of the lens during such a treatment is possible only by maintaining the partial pressure. There results an increased risk of modification of the dimensions of the lens since the lens necessarily adhere to one of two mold parts, the contact with the volatile matter is of course different on each of the faces.

OBJECT AND SUMMARY OF THE INVENTION

The object of the present invention is a process for making a soft contact lens of natural proteinaceous polymer which avoids the drawbacks described above. Another object of the invention is to provide a soft contact lens of natural proteinaceous polymer material made according to this process.

According to the present invention there is provided a process of the kind starting with a solution, herein referred to as a starting solution, comprising a non-crystalline natural proteinaceous polymer or mixture of non-crystalline natural proteinaceous polymers, of animal or vegetable origin, comprising the steps of: first gelling the starting solution in a mold adapted to impart the desired configuration, then after opening the mold, removing the lens from the mold prior to crosslinking and crosslinking the lens in a solvent medium by immersing the lens in a liquid containing a crosslinking agent.

In other words the present process is characterized by the following three successive stages.

1. A natural proteinaceous solution, possibly containing an agent contributing to physical gelling of the solution, is placed in a mold having concave and convex parts, adapted to impart to the solution the desired geometrical configuration and carrying out the physical gelling by reducing the temperature.

2. The lens is then entirely removed from the mold. At this stage the lens would rapidly dissolve in water failing crosslinking.

3. The lens is placed in a mixture of solvents selected to avoid the disintegration of the physical gel resulting after the first two stages. One or more crosslinking agents are added to this mixture of solvents thereby producing a crosslinked system which is insoluble in water.

Such crosslinking must be sufficiently thorough to avoid noncrosslinked fractions of gelatin (which would therefore be soluble) remaining in the polymer system defined by the lens to provide dimensional stability.

BRIEF DESCRIPTION OF DRAWING

The drawing shows a cross-sectional view of a mold for casting a contact lens according to the invention.

DETAILED DESCRIPTION OF THE PROCESS

Stages 1 and 2

To carry out the first two stages of the process, an aqueous gelatin solution having a 20–40% gelatin concentration is prepared, optionally with the addition of ammonium iron alum in a proportion of 0.1-5% by weight with respect to the gelatin. The starting solution is heated to a temperature between 60° and 90° C. in order to reduce the viscosity thereof to enable the two part mold (see drawing) to be filled. Such a mold is described in detail in U.S. Pat. No. 4,211,384 assigned to the assignee of the present application.

After the mold is heated to the same temperature as the starting solution, an amount of the solution is dispensed into the concave part 12A of the mold by means of a micropipette. The convex part 12B of the mold is then placed on the concave part 12A and the mold is closed under pressure in order to define a neat lens edge.

The entire mold is allowed to cool to ambient temperature of about 20° C. and thereafter is put in a refrigerator at 4° C. for a period of from 30 minutes to 4 hours.

After cooling, the mold is opened and the molded gel 10 is removed from the mold part (usually the convex part 12B) to which it has adhered, by means of a noncutting tool in order to preserve the quality of the resulting edge. The molded gel 10 may then undergo crosslinking in a solvent medium.

Stage 3

A gelatin gel put in water first swells and then starts to dissolve slowly. If it is placed in acetone or ethyl alcohol it dehydrates causing a reduction of its volume. By a judicious selection of two types of solvents, for example water and ethanol, it is possible to stabilize the dimensions of the gel. In this type of solvent mixture crosslinking of the gel is carried out.

Crosslinking is therefore disassociated from physical gelatin carried out in stages 1 and 2. Crosslinking is therefore carried out in a solvent medium with at least one of the following crosslinking agents:

37% aqueous solution of formic aldehyde
55% methanol solution of formic aldehyde
glyoxal
epichlorhydrin
dichloropropanol
dichloromethyl ethers
diepoxy-butane
trichloroisocyanuric acid
hexamethylenediisocyanate
ethylene-bis-methacrylamide
tetrachloropyrimidine
dimethylol urea
dimethylol acrylamide and generally all known componds for establishing covalent bonds with functional groups containing proteins.

A solvent may be prepared by mixtures of the following liquids:

water
dioxane
tetrahydrofuran
methyl pyrrolidone
dimethyl sulfoxide
ethanol
methanol
isopropyl alcohol.

In practice a carefully adjusted mixture of a good gelatin solvent with a nonsolvent like ethanol is used. The maximum acceptable percentage of the nonsolvent component is determined such that above that amount there is precipitation of the gelatin and separation of the phase and a cloudy appearance prejudicial to the good optical properties required.

For ethanol/water mixtures used in the examples described the ethanol/water ratio is between 1 and 4.

When using aldehydes in the crosslinking solution the pH thereof is adjusted in the base medium to values between 10 and 13 in order to accelerate crosslinking.

Several methods may be envisaged for carrying out the stage 3 of the process according to the invention.

Crosslinking in a solvent medium may be accomplished in one or two steps followed optionally in certain cases by a decoloration or bleaching step with the help of an oxydizing system such as hydrogen peroxide.

In Example 1 the crosslinking is carried out in one step with formaldehyde. The crosslinking itself is insufficient after a certain period of time and the resulting lenses have poor dimensional stability.

To overcome such poor dimensional stability two-step crosslinking was tried, which permits the amount of the crosslinking agent in the second step to be substantially increased: the formol in an aqueous or methanol solution, and the glutaraldehyde in Examples 2, 3 and 4. In Example 4 the resulting lenses were markedly yellow. It was found that in certain conditions treatment with hydrogen peroxide may overcome this drawback without causing a damage to the lens, see Example 5.

Research carried out in the development of heart valves from porcine heart valves shows that the stability connected with crosslinking is markedly greater if it is carried out with glutaraldehyde. Examples 6 and 7 illustrate such a method of preparation with decoloration by means of hydrogen peroxide.

Unexpectedly it has been found that by adding polyformaldehyde to the glutaraldehyde (a low molecular weight polymerized formaldehyde) it was possible to obtain practically colorless crosslinked lenses thereby eliminating the necessity of decoloration with hydrogen peroxide when using glutaraldehyde, as disclosed in Example 8.

The natural polymer contact lens resulting from stages 1 and 2 is not crosslinked and therefore is apt to be deformed. If the gel is deformed before crosslinking in stage 3, crosslinking will retain such deformations and the ultimate lens, after the final steps, will still be deformed. It is therefore important not to cause any anisotropic deformations during stage 3.

Accordingly, when the lens is immersed in the solution containing the crosslinking agent, the latter is kept in motion either by circulating it in a closed circuit or by imparting vibrations to a cell for holding the gel in the solution.

The lens may thus be maintained in suspension in the liquid and will not have a tendency to rest against a wall or surface which might cause deformation.

Another means for avoiding deformation consists in placing the gel on a suitably shaped support member which is porous so that the crosslinking solution can exert its action symmetrically on both faces of the gel.

EXAMPLE 1

Crosslinking solution for a total of 100.05 parts was prepared consisting of:
70 parts ethanol
20 parts distilled water
10 parts of a 37% formol solution including the necessary amount of formaldehyde
0.05 part of a sodium hydroxide having a concentration of 400 g/l.

The crosslinking in this solution was limited to 8 hours because beyond that point hydrolysis of the lens occurs.

The dimensional stability of the resulting lens was unsatisfactory.

EXAMPLE 2

Crosslinking was carried out in two steps.

In a first step the molded gel to be crosslinked was immersed for 1 hour in a crosslinking solution having the following composition, for a total of 105.5 parts:
70 parts ethanol
25 parts distilled water 10 parts 37% formol solution including the necessary amount of formaldehyde,
0.5 part sodium hydroxide having a concentration of 400 g/l.

After washing and drying the lens was immersed for 2 hours in another crosslinking solution having the following composition for a total of 100.5 parts.
70 parts ethanol
30 parts 37% formol solution
0.5 part sodium hydroxide having a concentration of 400 g/l.

The resulting lens was dimensionally stable but had a markedly yellow hue.

EXAMPLE 3

Crosslinking was carried out in two steps.
The first step was identical to that of Example 2.
After washing and drying the molded gel was immersed for 2 hours in a solution having the following composition for a total of 81.5 parts.
80 parts ethanol
1 part distilled water
0.5 part sodium hydroxide having a concentration of 400 g/l to which 4 g of polyformaldehyde was added.

After rinsing the lens thus treated was completely transparent without any yellowish coloring and had good dimensional stability.

EXAMPLE 4

Crosslinking was carried out in two steps, first of all, for 1 hour in a treatment solution having a following composition for a total of 100.1 parts.
70 parts ethanol
20 parts distilled water
10 parts 37% formol solution
0.1 part sodium hydroxide with a concentration of 400 g/l.
and then for 12 hours in a treatment solution having the following composition for a total of 100.1 parts:
70 parts absolute ethyl alcohol
25 parts distilled water
5 parts glutaraldehyde
0.1 part sodium hydroxide having a concentration of 400 g/l.

The dimensional stability of the resulting lens was satisfactory and superior to that of Examples 2 and 3 but bleaching was necessary.

EXAMPLE 5

It was carried out in two steps identical to those of Example 4.
The resulting lens at the end of the second step was then rinsed in a solution containing hydrogen peroxide.
Such a hydrogen peroxide solution may for example contain 60 cc of hydrogen peroxide and 140 cc of a buffer solution being obtained by mixing 2.5 g of sodium pyrophosphate in 200 cc of distilled water.
The contact lens is left for example for 4 to 16 hours in such a bleaching solution. It is then rinsed and immersed in a solution containing a catalyst such as an ensymatic or metallic platinum or chromium catalyst adapted to ensure the decomposition of the hydrogen peroxide.
The resulting lens was transparent and had good dimensional stability.

EXAMPLE 6

A single step crosslinking was carried out by immersion for 20 hours in a crosslinking solution having the following composition, for a total of 102.5 parts:
70 parts ethanol
30 distilled water
2 parts glutaraldehyde
0.05 part sodium hydroxide with a concentration of 400 g/l.

The contact lens thus treated had good dimensional stability.

To illustrate this advantage, it is possible to indicate that immersed for one month after its fabrication in a liquid having a composition comparable to that of lacrymal film, the contact lens which initially had a diameter of 13 mm had a deformation less than 0.5 mm, which is considered thoroughly acceptable by those skilled in the art.

In practice it resists boiling water without deformation.

But it has a yellowish color.

EXAMPLE 7

Crosslinking was carried out in a single step identical to that of Example 6. The lens was the bleached according to the procedure of Example 5.

EXAMPLE 8

Crosslinking was carried out in a single step by immersion for 20 hours in a crosslinking solution which has the following solution for a total of 101.05 parts:
55 parts ethanol
45 parts distilled water
1 part glutaraldehyde
0.05 part sodium hydroxide having a concentration of 400 g/l with the addition of 2 g of polyformaldehyde.

A contact lens thus treated is completely transparent without any yellowing and, like the preceding example, it has very good dimensional stability notably with respect to heat.

In practice it also resists boiling water without deformation.

Example 8 constitutes the best mode of carrying out the process according to the invention.

Obviously the above examples should not be considered as limiting the present invention which, on the contrary, is intended to cover all variations and alternatives understood to those skilled in the art.

In particular the use of a basic medium for the crosslinking is preferable, for in addition to the reduction of time necessary for this crosslinking, it also provides improved water resistance and therefore enhances dimensional stability and mechanical strength of the contact lenses treated. Acid mediums can also be envisaged.

In either case it is a matter of catalyzing the crosslinking.

Finally, the field of the invention is not limited to that of gelatins but according to the teachings of European patent No. 0 011 523 includes, to the contrary, the use of any other protein such as edible soybean protein and, more generally, any kind of noncrystalline proteinaceous polymer, optionally mixed with one or more other proteins.

What is claimed is:

1. A process for making a soft contact lens of natural proteinaceous polymer(s) comprising the steps of:
   preparing a solution comprising noncrystalline proteinaceous polymer of animal or vegetable origin or a mixture of more than one polymer,
   introducing the starting solution in a mold for imparting thereto a sought after lens shape and gelling the base solution in the mold,
   opening the mold and removing the lens shaped gel therefrom prior to crosslinking, and
   immersing the gel in an aqueous solution containing a crosslinking agent until desired crosslinking of the gel is obtained, wherein the pH of the aqueous solution is in the range of about 10 to 13.

2. The process according to claim 1, wherein the molded gel is held in suspension in the aqueous solution.

3. The process according to claim 1, wherein the molded gel is supported in the aqueous solution on a suitably shaped porous support.

4. The process according to claim 1, wherein the gel is kept in motion in the solution during crosslinking to prevent deformation.

5. The process according to claim 1, wherein the aqueous solution comprises a good gel solvent and a nonsolvent, the relative amounts of the solvent and nonsolvent being selected to avoid precipitation, separation and clouding of the gel.

6. A process for making a soft contact lens of natural proteinaceous polymer(s) comprising the steps of:
   preparing a solution comprising noncrystalline proteinaceous polymer of animal or vegetable origin or a mixture of more than one polymer,
   introducing the starting solution in a mold for imparting thereto a sought after lens shape and gelling the base solution in the mold,
   opening the mold and removing the lens shaped gel therefrom prior to crosslinking, and
   immersing the gel in an aqueous solution containing a crosslinking agent comprising ethanol, glutaraldehyde, sodium hydroxide and polyformaldehyde until desired crosslinking of the gel is obtained.

7. The process according to claim 6, wherein the molded gel is held in suspension in the aqueous solution.

8. The process according to claim 6, wherein the molded gel is supported in the aqueous solution on a suitably shaped porous support.

9. The process according to claim 6, wherein the aqueous solution is a basic medium.

10. The process according to claim 9, wherein the pH of the aqueous solution is in the range of about 10 to 13.

11. The process according to claim 6, wherein the gel is kept in motion in the solution during crosslinking to prevent deformation.

12. The process according to claim 6, wherein the aqueous solution comprises a good gel solvent and a nonsolvent, the relative amounts of the solvent and nonsolvent being selected to avoid precipitation, separation and clouding of the gel.

13. The process according to claim 6, wherein the aqueous solution contains about 55 parts ethanol, about 45 parts water, about 1 part glutaraldehyde, about 0.05 part sodium hydroxide having a concentration of about 400 g/l and about 2 g of polyformaldehyde.

* * * * *